(12) United States Patent
Shirato (10) Patent No.: US 7,280,296 B2
(45) Date of Patent: Oct. 9, 2007

(54) APPARATUS AND METHOD FOR RECORDING DIGITAL BROADCAST ON EXCHANGEABLE STORAGE MEDIUM, AND EXCHANGEABLE STORAGE MEDIUM THEREFOR

(75) Inventor: Mitsunori Shirato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 609 days.

(21) Appl. No.: 10/407,810

(22) Filed: Apr. 4, 2003

(65) Prior Publication Data

US 2003/0210485 A1 Nov. 13, 2003

(30) Foreign Application Priority Data

Apr. 9, 2002 (JP) .............................. 2002-106152

(51) Int. Cl.
*G11B 5/09* (2006.01)
*H04H 1/00* (2006.01)
(52) U.S. Cl. ........................................ 360/55; 455/3.03
(58) Field of Classification Search ..................... None
See application file for complete search history.

(56) References Cited

U.S. PATENT DOCUMENTS

| 5,361,173 | A | * | 11/1994 | Ishii et al. ..................... 360/27 |
| 5,857,149 | A | | 1/1999 | Suzuki |
| 6,169,844 | B1 | | 1/2001 | Arai |
| 6,173,112 | B1 | * | 1/2001 | Gruse et al. .................. 386/83 |
| 6,407,750 | B1 | * | 6/2002 | Gioscia et al. .............. 715/716 |
| 6,614,987 | B1 | * | 9/2003 | Ismail et al. .................. 386/83 |
| 6,680,931 | B1 | * | 1/2004 | Aigasa et al. ................ 370/349 |
| 6,853,388 | B2 | | 2/2005 | Ueno et al. |
| 6,885,809 | B1 | * | 4/2005 | Asada .......................... 386/46 |
| 7,154,538 | B1 | | 12/2006 | Fukasawa et al. |
| 2003/0026344 | A1 | * | 2/2003 | Rindsberg et al. .......... 375/260 |
| 2003/0158614 | A1 | * | 8/2003 | Friel et al. ..................... 700/94 |
| 2005/0201313 | A1 | * | 9/2005 | Koga et al. .................. 370/313 |

FOREIGN PATENT DOCUMENTS

| JP | 63-013483 | 1/1988 |
| JP | 2001-142896 | 5/2001 |
| JP | 03-271798 | 12/2001 |
| WO | WO95/33318 | 12/1995 |
| WO | PCT/JP01/01271 | 2/2001 |

* cited by examiner

*Primary Examiner*—Andrea Wellington
*Assistant Examiner*—Varsha A. Kapadia
(74) *Attorney, Agent, or Firm*—Brinks Hofer Gilson & Lione (57) ABSTRACT

An apparatus and method for recording digital broadcasts on an exchangeable storage medium are provided for automatically recording broadcast contents desired by a user on the exchangeable storage medium. When recording the digital broadcast contents on exchangeable storage media MS1 to MS3, a recording condition of the broadcast contents is written in the exchangeable storage medium, and then the digital broadcast with n channels data multiplexed therein is received. At this time, it is checked whether or not the recording condition in the exchangeable storage medium is satisfied, with reference to information included in each channel data. If predetermined channel data satisfies the recording condition, the broadcast contents included in the predetermined channel data are recorded on the exchangeable storage medium.

20 Claims, 5 Drawing Sheets

RECORDING FORMAT

| MEMORY TITLE | CONDITION | UNOCCUPIED CAPACITY | CAPACITY HAVING FLAG ATTACHED | | | | | |
|---|---|---|---|---|---|---|---|---|
| PROGRAM NAME | SONG NAME | RECORDED CH | PTY OF RECORDED CH | ARTIST'S NAME | RECORDING DATE AND TIME | TIME INTERVAL | BORED | POINTER BROADCAST DATA |
| PROGRAM NAME | SONG NAME | RECORDED CH | PTY OF RECORDED CH | ARTIST'S NAME | RECORDING DATE AND TIME | TIME INTERVAL | BORED | POINTER BROADCAST DATA |
| ..... | | | | | | | | |
| ..... | | | | | | | | |
| PROGRAM NAME | SONG NAME | RECORDED CH | PTY OF RECORDED CH | ARTIST'S NAME | RECORDING DATE AND TIME | TIME INTERVAL | BORED | POINTER BROADCAST DATA |

MEMORY CONTENTS

| PROFILE OF MEMORY | | TITLE | SEIKO MATSUDA by SDARS | | | | | |
|---|---|---|---|---|---|---|---|---|
| | | CONDITION | ARTIST'S NAME = SEIKO MATSUDA | | | | | |
| DATA | No. | PROGRAM NAME | SONG NAME | RECORDED CH | PTY OF RECORDED CH | ARTIST'S NAME | RECORDING DATE AND TIME | TIME INTERVAL | BORED |
| | 1 | JPOP STUDIO | RED SWEET PEA | 2 | VARIETY | SEIKO MATSUDA | 1998/1/1 | 214 | ON |
| | 2 | HIIT SONGS | WHITE PARASOL | 54 | POPS | SEIKO MATSUDA | 1998/2/3 | 312 | OFF |
| | 3 | BEST HIT 100 | SECRET FLOWER GARDEN | 18 | JPOP | SEIKO MATSUDA | 1998/3/3 | 200 | ON |
| | 4 | CHANNEL 14 | WINDOW TOWARD SUMMER | 14 | JPOP | SEIKO MATSUDA | 1998/4/12 | 150 | ON |
| | 5 | CHANNEL 14 | KISS IN HEAVEN | 14 | JPOP | SEIKO MATSUDA | 1998/6/24 | 222 | OFF |
| | 6 | JAPANESE FAMOUS SONGS | APPLE OF GLASS | 18 | JPOP | SEIKO MATSUDA | 1999/4/4 | 245 | OFF |
| | 7 | FAMOUS SONGS IN THE SHOWA ERA | WIND BLEW | 18 | JPOP | SEIKO MATSUDA | 1999/5/5 | 300 | OFF |
| | 8 | CHANNEL 14 | BALCONY TOWARD BEACH | 14 | JPOP | SEIKO MATSUDA | 2000/2/14 | 288 | OFF |
| | 9 | CHANNEL 14 | ETUDE OF WILD ROSES | 14 | JPOP | SEIKO MATSUDA | 2000/3/15 | 277 | ON |
| | 10 | JPOP STUDIO | MONOPOLISTIC INTERVIEW | 2 | VARIETY | SEIKO MATSUDA | 2001/4/5 | 244 | OFF |
| | 13 | HIIT SONGS | MERMAID WITH A BRONZED SKIN | 54 | POPS | SEIKO MATSUDA | 2002/1/3 | 268 | OFF |

FIG.5

APPARATUS AND METHOD FOR RECORDING DIGITAL BROADCAST ON EXCHANGEABLE STORAGE MEDIUM, AND EXCHANGEABLE STORAGE MEDIUM THEREFOR

BACKGROUND

1. Field of the Invention

The present invention relates to an apparatus and method for recording digital broadcasts on an exchangeable storage medium, and to the exchangeable storage medium therefor. In particular, the invention relates to a digital broadcast recording apparatus and method for automatically recording desired broadcast contents on an exchangeable storage medium such as a SD card, a memory stick, a MD, or the like without operating a recording start button, especially for efficiently recording the broadcasting contents on the exchangeable storage medium, and it also relates to the exchangeable storage medium therefor.

2. Description of the Related Art

There has been developed a music reproducing device for a vehicle that receives therein a recordable medium such as a MD, a SD memory card, a memory stick or the like and which permits reproduction of data stored in the recordable medium. In the future, it is anticipated with the spread of digital broadcasts for a vehicle that there will appear a recording and reproducing apparatus for a vehicle which records the contents of a vehicle digital broadcast on the above-mentioned medium and which enables reproduction thereof.

If the vehicle recording and reproducing apparatus requires an operation from a user to select and record desired pieces of music one by one from the digital broadcasts, the recording process becomes complex and thereby fails to make full use of the functionality of the recording apparatus. That is, the recording and reproducing apparatus for the vehicle requires the ability to record desired broadcast contents by a simple operation.

A present portable, exchangeable storage medium that is attachable and detachable, such as the memory card, the memory stick, or the like, has a memory capacity on the order, at most, of 100 MB. When a compression technique such as MP 3 is applied to Japanese music to store the compressed music within this capacity, the number of musical pieces or songs recorded therein is about ten at most. Even if the capacity is increased hereafter, generalization of video contents and the like will be brought about at the same time, and therefore it is easily estimated that the number of songs that are able to be recorded will not change much. In short, the vehicle recording and reproducing apparatus also requires the ability to efficiently record the desired broadcast contents.

BRIEF SUMMARY

The present invention has been accomplished in view of the above-mentioned technical background, and it is a first object of the present invention to provide an improvement that permits automatic recording of broadcast contents as desired by a user on an exchangeable storage medium.

It is a second object of the present invention to provide an improvement that efficiently records broadcasting data on the exchangeable storage medium even when the capacity of the medium is small.

To solve the foregoing problems, according to a first aspect of the present invention, there are provided a recording apparatus and method for recording the contents of a digital broadcast on an exchangeable storage medium, comprising the features of (1) writing a recording condition of the broadcast contents in the exchangeable storage medium, (2) receiving the digital broadcast with n channels data multiplexed therein, and checking whether the above-mentioned recording condition on the exchangeable storage medium is satisfied or not with reference to information included in each channel data, and (3) when predetermined channel data satisfies the recording condition, recording the broadcast contents included in the predetermined channel data on the exchangeable storage medium.

Further, the recording apparatus and method for the exchangeable storage medium according to the present invention comprise the features of (4) when broadcast content data recorded on the exchangeable storage medium is in a rewritable state, recording a flag for designating the rewritable state in response to this broadcast content data, and (5) if there is no unoccupied space for recording new broadcast content data, checking whether rewritable broadcast content data exists or not based on the flag, and then if rewritable broadcast content data exists, regarding an area where the rewritable broadcast content data exists as a new unoccupied space, and recording new broadcast content data in this area.

According to a second aspect of the present invention, there is provided an exchangeable storage medium for recording the contents of a digital broadcast, comprising an area for recording a recording condition of the broadcast contents, and a broadcast content recording area for recording broadcast contents that satisfy the above-mentioned broadcast content recording condition.

In accordance with the present invention, the recording apparatus and method and the exchangeable storage medium therefor enable automatic recording of broadcast contents desired by a user on the exchangeable storage medium. Also, even when the capacity of the medium is small, it is possible to efficiently record broadcasting data needed in a true sense on the exchangeable storage medium, while erasing unnecessary recorded broadcast contents.

Additionally, an exchangeable storage medium having a predetermined password written therein as an automatic recording condition is associated with a product (for example, a vehicle body, a vehicle-mounted device, or the like), and then this exchangeable storage medium is distributed to a purchaser of this product. When the most up-to-date maintenance information including the above-mentioned password as label information is broadcast, it is stored in the exchangeable storage medium. This constantly allows the user to be informed of or to receive the most up-to-date maintenance information or recall information.

Figure 1:
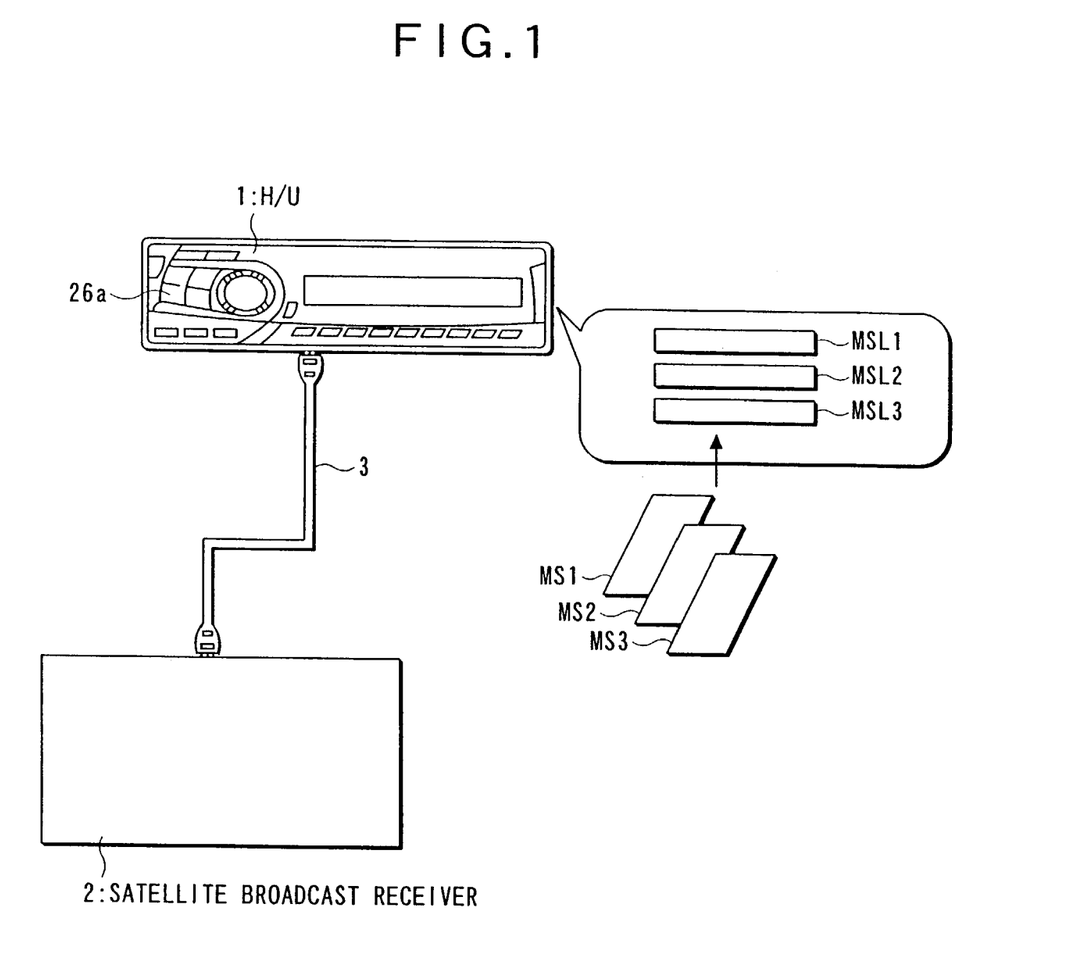
FIG. 1 is a diagram showing the general configuration of a music system for a vehicle according to the present invention.

DETAILED DESCRIPTION OF THE PREFERRED EMBODIMENTS (A) General Configuration of a Music System for a Vehicle FIG. 1 shows the general configuration of a music system for a vehicle in accordance with the present invention. This music system comprises a head unit (H/U) 1 including a FM/AM tuner, a CD player, a memory-stick recording and reproducing device, and the like, and a satellite broadcast receiver 2. The head unit 1 and the satellite broadcast receiver 2 are connected together through a cable 3. On the front surface of the head unit 1, there are provided various operating buttons, displays and the like. This front surface (face) is rotatably disposed, and hence rotation of the front surface causes a CD slot and memory stick slots MSL1 to MSL3 to be exposed, into and from which slots a CD and memory sticks MS1 to MS3 are insertable and removable.

The memory sticks MS1 to MS3 have specific profiles already written therein by a user. While the head unit 1 and the digital broadcast receiver 2 are being operated, the sticks automatically record digital broadcast data in compliance with their respective profiles. For example, when a profile of recording Japanese music hit chart is written in the memory stick MS3, this memory stick MS3 will continue recording the Japanese music hit chart in the operation of the system until the capacity of the stick becomes full with the chart. Whether automatic recording is conducted or not is determined based on a program type PTY or label information.

In the above description, the case of writing onto the memory stick has been explained, but the user can listen to the contents of the memory sticks MS1 to MS3 at will, which contents are managed by the profile in each memory stick. This facilitates determining or referring to what is included in the medium. If there is any song with which the user feels bored after listening several times, he or she depresses a "bored" button 26a for the song during reproduction so as to provide the song data being listened to with a "bored" flag (or, a rewritability flag). This makes it possible to overwrite data having the "bored" flag when there is no free or unoccupied space in the memory capacity and when there is data (for example, the Japanese music hit chart) to be recorded in the operation of the system.

(B) Main Configuration of Satellite Broadcast Receiver and Head Unit

Figure 2:
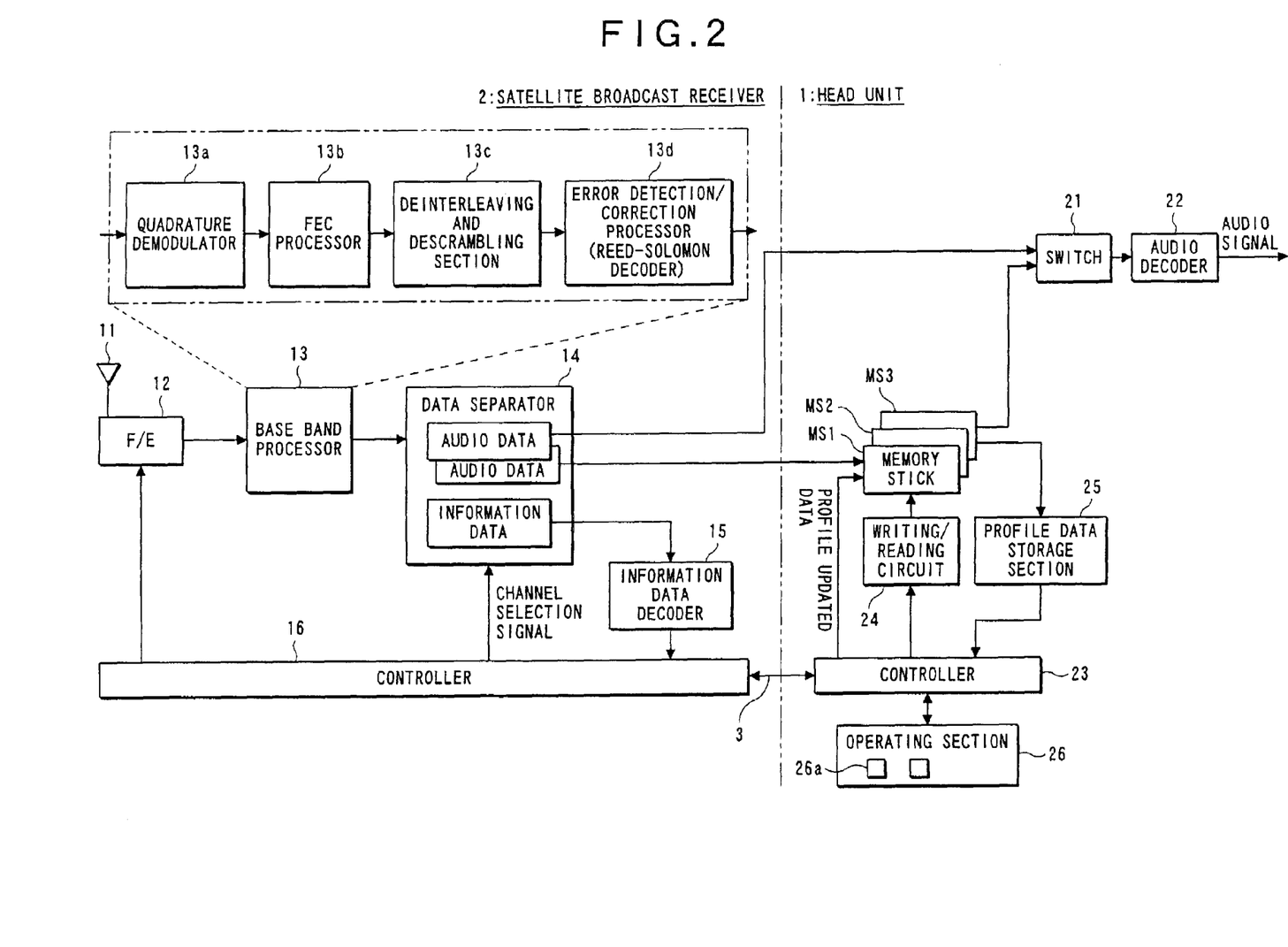
FIG. 2 is a diagram showing the main configuration of a satellite broadcast receiver and a head unit.

FIG. 2 shows the main configuration of the satellite broadcast receiver and the head unit.

In the satellite broadcast receiver 2, an antenna 11 receives radio waves of broadcast signals from a satellite. A front end (F/E) section 12 extracts a desired reception frequency component from the broadcast signals received through the antenna 11, and then frequency-converts the extracted broadcast signal into an intermediate frequency signal and supplies it as an output. A base band processor 13 includes a quadrature demodulator 13a, a FEC processor 13b, a deinterleaving and descrambling section 13c, and an error detection/correction processor 13d. They subject the intermediate frequency signal received from the front end section 12 to quadrature demodulation processing and FEC (Forward Error Correction) processing, and reset the deinterleaving, while descrambling to restore the signal to an original train of data. Finally, error detection/correction processing (Reed-Solomon decoding processing) is performed, so that high efficiency code data (MPEG data) is produced. A data separator 14 separates from the high efficiency code data (MPEG data) of all channels received from the base band processor 13, (1) MPEG audio data of a channel selected by a user or of a channel which satisfies an automatic recording condition designated by the profile recorded on the memory stick (described later), and (2) information data of all the data channels. Then the data separator supplies the MEPG audio data to the head unit 1, while supplying the information data to a controller 16 through an information data decoder 15.

In the head unit 1, the MPEG audio data of the channel selected by the user is supplied to an audio decoder 22 through a switch 21, and then is decoded into a PCM audio signal, which is supplied to an audio circuit (not shown) to be produced from a speaker.

In profile areas of the respective memory sticks MS1 to MS3, profile information indicating a summary of recorded broadcast contents (for example, a program name, a song name, an artist's name, a recording date and time, a rewritability flag, or the like) is recorded. This profile information includes a condition for automatically recording the broadcast contents, for example, the artist's name and the like. It should be noted that the automatic recording condition is different depending on every memory stick.

A controller 23 controls a writing/reading circuit 24 and reads the profile information from the memory sticks MS1 to MS3 attached to slots, to store the information in a storage section 25. The controller informs the satellite broadcast receiver 2 of the automatic recording condition (for example, the artist's name or the like) for each memory stick. Further, the controller 23 informs the satellite broadcast receiver 2 of a channel selected by the user's operation of an operating section 26, while writing the rewritability flag in the profile area in response to the recorded broadcast contents designated by operating a "bored" button 26a on the operating section.

When broadcast contents satisfying the automatic recording condition identified by the head unit 1 is broadcast, the controller 16 of the satellite broadcast receiver 2 informs the controller 23 in the head unit 1 of broadcast information (for example, the program name, the song name, a recorded channel, a program type PTY of the recorded channel, the artist's name, a broadcasting time interval, and the like), while supplying the MPEG audio data to the head unit 1.

The controller 23 of the head unit 1 checks whether broadcast data can be written or not with reference to the profile information of the appropriate or associated memory stick. If possible, it updates the profile information, while writing the audio data in an audio data storage area of the memory stick.

When reproducing the memory stick, a memory stick of interest is designated and instructed to be reproduced by the operating section 26. Thereafter, the controller 23 controls the writing/reading circuit 24 to read the audio data from the designated memory stick, causing the audio data to be supplied to the audio decoder 22 through the switch 21.

(C) Explanation of Frame Configuration of Digital Broadcast

Figure 3:
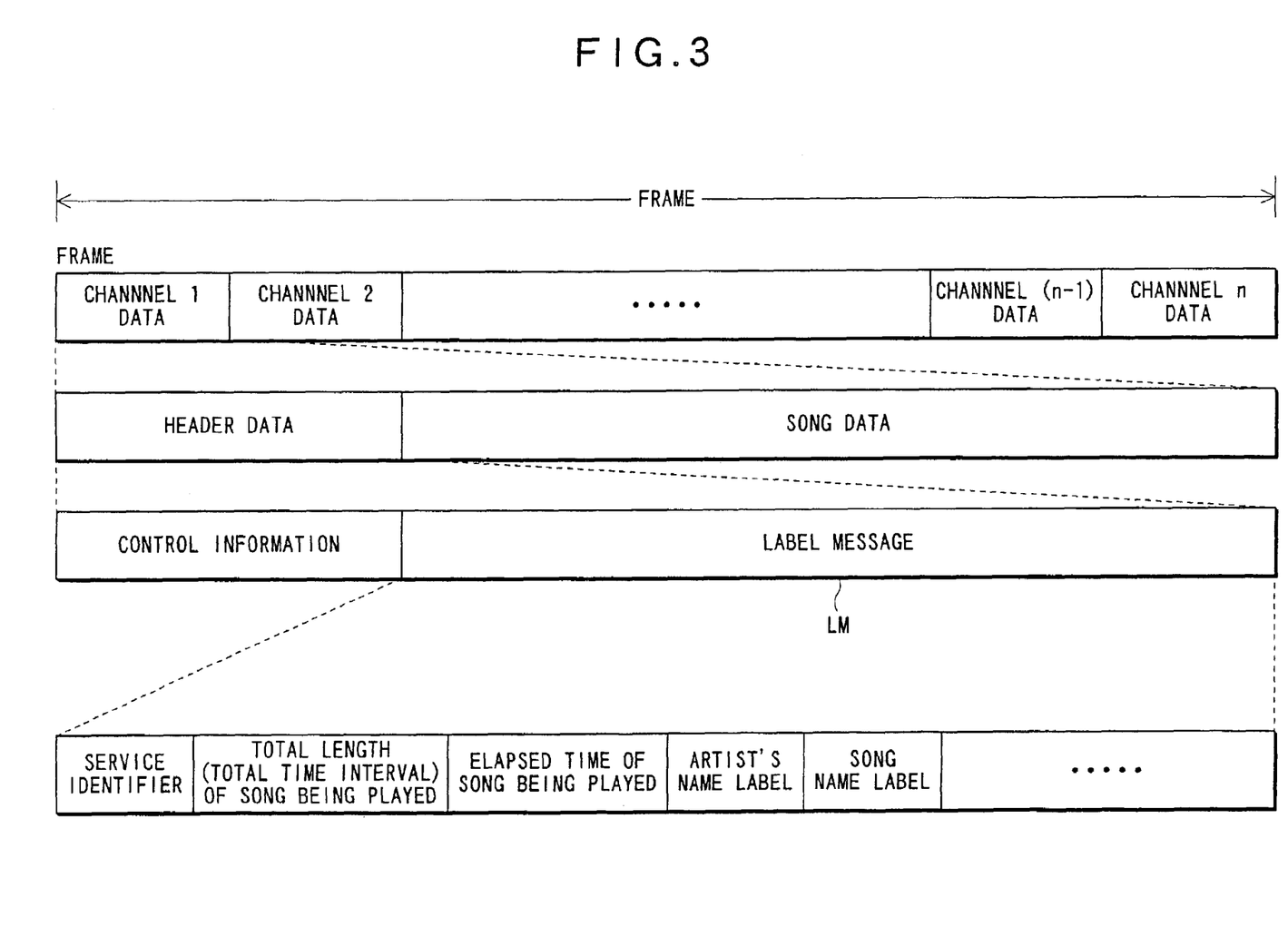
FIG. 3 is an explanatory diagram showing a frame configuration of a digital broadcast.

FIG. 3 is an explanatory diagram showing a frame configuration of the digital broadcast. In this configuration, the broadcast contents of n channels are subjected to time division multiplexing into a frame of a predetermined length. This frame is transmitted in sequence, so that broadcasts of n channels are sent simultaneously.

The frame includes data on all channels, namely channels 1 to n. Each channel data includes (1) header data, and (2)

broadcast content data currently being broadcast (for example, in the case of music, song data). The header data includes (1) control information, (2) a label message LM and the like. This label message LM includes a service identifier (program name), a total length (total time interval) of a song being played, an elapsed time of the song being played, an artist's name of the song, a song name, and the like.

Figure 4:
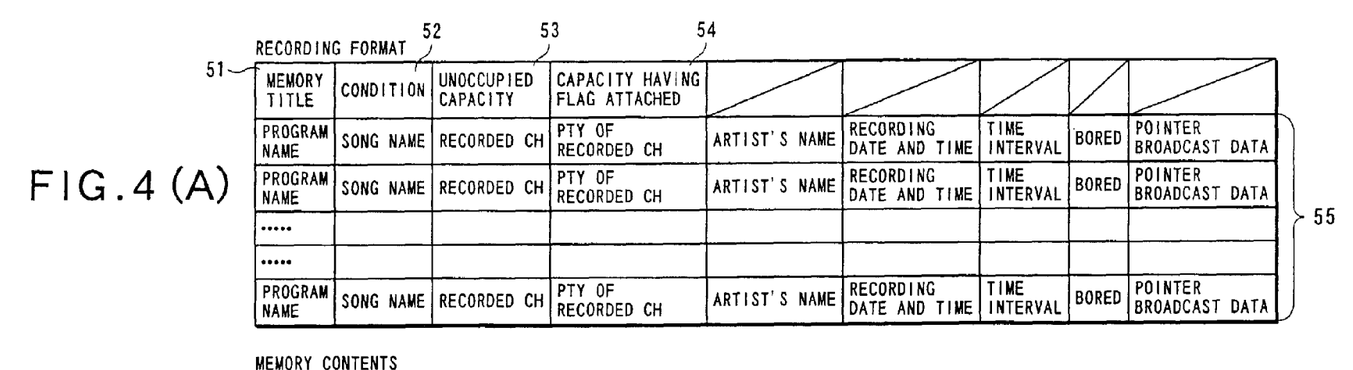
FIG. 4 is an explanatory diagram showing a recording format of a profile recorded in a memory stick and the actual memory contents.

FIG. 4 is an explanatory diagram showing a recording format of profile information recorded in the profile area of the memory stick and actual memory contents. The profile information, as shown in (A) of the figure, is composed of:

(1) a title 51;
(2) an automatic recording condition 52;
(3) an unoccupied capacity and unoccupied address information 53;
(4) a total capacity of areas having rewritability flags, and the address information of these areas 54; and
(5) recorded broadcast content files 55.

Each of the broadcast content files 55, as shown in (B) of the figure, includes:

(1) the data number;
(2) a program name;
(3) a song name;
(4) a recorded channel, and a PTY of the recorded channel;
(5) an artist's name;
(6) a recording date and time;
(7) a recording time interval;
(8) a rewritability flag ("bored" flag); and
(9) a pointer for designating a storing position of the broadcast data.

FIG. 4(B) shows recorded profile information under an automatic recording condition of "artist's name=Seiko Matsuda".

(D) Automatic Recording Processing

Figure 5:
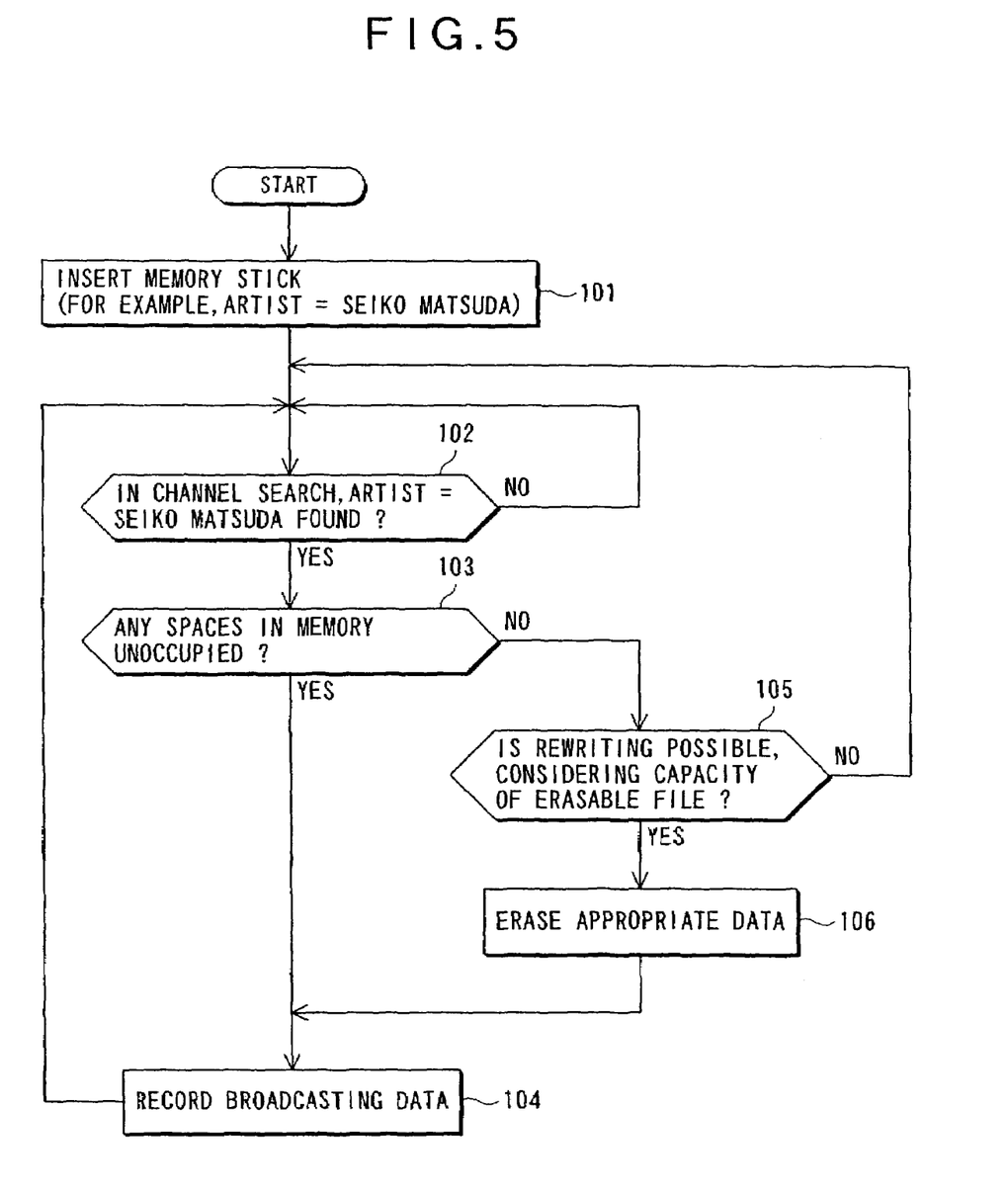
FIG. 5 is a flowchart showing the automatic recording of a digital broadcast onto an exchangeable storage medium according to the present invention.

FIG. 5 shows a flowchart of the automatic recording of a digital broadcast onto the exchangeable storage medium in accordance with the present invention.

A memory stick whose automatic recording condition is set as, for example "artist's name=Seiko Matsuda", is inserted into the slot (step 101). The controller 23 of the head unit 1 reads a profile of the memory stick attached thereto into the storage section 25, and extracts the automatic recording condition (the artist's name=Seiko Matsuda) to supply it to the satellite broadcast receiver 2.

The controller 16 of the satellite broadcast receiver 2 checks whether broadcast contents concern music of artist Seiko Matsuda or not with reference to a label message LM (see FIG. 3) of each channel (step 102). If not, it continues checking whether broadcast contents on the subsequent data channels concern the music of artist Seiko Matsuda.

If broadcast contents on a predetermined channel concern the music of Seiko Matsuda, the controller 16 of the satellite broadcast receiver 2 informs the controller 23 in the head unit 1 of the broadcast information (for example, a program name, a song name, a recorded channel, a program type PTY of the recorded channel, an artist's name, a broadcasting time interval, and the like), while supplying MPEG audio data to the head unit 1.

The controller 23 of the head unit 1 checks whether there are sufficient unoccupied spaces to write all the broadcast contents of interest, referring to the profile information of the memory stick. If there are sufficient unoccupied spaces for complete writing, the controller 23 writes the audio data in the memory stick, while updating the profile information (step 104). Subsequently, the operation returns to the step 102 and waits until a next automatic recording condition is satisfied.

On the other hand, if there are not enough unoccupied spaces to write all the broadcast contents of interest in the step 103, the controller checks whether the total amount of the capacity of a file provided with a rewritability flag and an unoccupied capacity reaches a level sufficient to completely write all the broadcast contents of interest (step 105). If the total amount does not reach a sufficient capacity level, the operation returns to step 102 and waits until a next automatic recording condition is realized.

If sufficient capacity is available in step 105, the file provided with the rewritability flag is erased (step 106), and the audio data is written in the memory stick, while the profile information is updated (step 104). Thereafter, the operation returns to step 102 and waits until a next automatic recording condition is satisfied.

(E) Other Applications

It should be noted that in the above-mentioned embodiments, audio data of music are automatically recorded in the memory sticks, but the invention is not limited thereto. In addition to music audio data, audio data of messages may also be recorded automatically.

Also, the following usage may be employed. For example, a memory stick which has a predetermined password previously written therein as an automatic recording condition is distributed to or purchased by a user. When a program (that is, an advertisement) including the password in a label message is broadcast, the advertising contents are automatically recorded in the memory stick. This can provide an advertisement form in which advertising contents are able to be constantly updated.

Further, suppose that a memory stick having a predetermined password written therein as an automatic recording condition is associated with a vehicle body or a vehicle-mounted device. A purchaser of the vehicle body or the device is provided with the memory stick. When the most up-to-date maintenance information having this password in the label information is broadcast, it is stored in the memory stick, thereby constantly enabling the user to receive the most up-to-date maintenance information. In this case, if recall information is broadcast as the maintenance information, the recall can be completely communicated to all users.

It should be noted that in the above description, the head unit automatically records the broadcast contents in the memory stick, but the invention is not limited thereto. For example, a digital broadcast receiver may automatically record the broadcast contents in the memory stick.

Further, in the above-mentioned embodiments, the broadcast contents are automatically recorded in the memory stick, but they may be recorded in another exchangeable storage medium such as a SD memory card, a mini disc, or the like.

As can be seen from the above-mentioned description, in accordance with the present invention, broadcast contents desired by a user can be automatically recorded on the exchangeable storage medium.

Further, according to the present invention, even when the capacity of the exchangeable storage medium is small, broadcast data really needed can be efficiently recorded on the exchangeable storage medium, while erasing unnecessary recorded broadcast contents.

Further, according to the present invention, the profile information is stored in the exchangeable storage medium, thereby facilitating data management.

Further, according to the present invention, the exchangeable storage medium such as a memory stick or the like, including specific profile information (for example, a password) is sold and distributed, thus providing a new advertisement and service form.

In addition, the exchangeable storage medium in which a predetermined password is written as an automatic recording condition is associated with a product (for example, a vehicle body, or a vehicle-mounted device), and hence a purchaser of this product is provided with this exchangeable storage medium. When the newest maintenance information having the above-mentioned password as label information is broadcast, it is stored in the exchangeable storage medium. thereby constantly enabling the user to be informed of and to have the newest maintenance information or recall information.

The invention claimed is:

1. A method for recording the contents of a digital broadcast on an exchangeable storage medium, the method comprising:
    writing a recording condition in said exchangeable storage medium describing a user preference and used to select at least one preferred piece of music to be recorded from the digital broadcast, said exchangeable storage medium being (1) operable to digitally record music data associated with the at least one preferred piece of music selected from the digital broadcast and (2) removably attachable to a music system including a FM tuner that is operable to audibly reproduce the at least one preferred piece of music selected from the digital broadcast using the digital music data stored on the exchangeable storage medium;
    receiving the digital broadcast with n channels of data multiplexed therein, each of the n channels of data including MPEG audio data;
    automatically checking whether said recording condition is satisfied with reference to information describing the contents of the digital broadcast included in each of the n channels of data; and
    when information describing the contents of the digital broadcast associated with a channel satisfies the recording condition, automatically recording the broadcast content data associated with the channel on the exchangeable storage medium.

2. The method for recording a digital broadcast on the exchangeable storage medium according to claim 1, further comprising:
    when said broadcast content data recorded on the exchangeable storage medium is in a rewritable state, recording a flag for designating the rewritable state in response to a user designating the broadcast content data for deletion;
    if there is no unoccupied space for recording new broadcast content data, checking whether rewritable broadcast content data exists based on said flag; and
    if rewritable broadcast content data exists, regarding an area where the rewritable broadcast content data exists as a new unoccupied space and then recording the new broadcast content data in the area.

3. The method for recording a digital broadcast on the exchangeable storage medium according to claim 1, further comprising writing information describing the broadcast contents recorded on the exchangeable storage medium in a profile area of said exchangeable storage medium.

4. The method for recording a digital broadcast on the exchangeable storage medium according to claim 3, further comprising:
    when said broadcast content data recorded on the exchangeable storage medium is in a rewritable state, recording a flag for designating the rewritable state in response to a user designating the broadcast content data for deletion;
    if there is no unoccupied space for recording new broadcast content data, checking whether rewritable broadcast content data exists based on said flag; and
    if rewritable broadcast content data exists, regarding an area where the rewritable broadcast content data exists as a new unoccupied space and then recording the new broadcast content data in the area.

5. The method for recording a digital broadcast on the exchangeable storage medium according to claim 1, wherein said recording condition describes a musical artist's name and the MPEG audio data is music audio data, and the n channels of data are searched only for songs that are associated with the musical artist.

6. The method for recording a digital broadcast on the exchangeable storage medium according to claim 1, wherein said recording condition describing the broadcast contents includes a password associated with a vehicle body or a vehicle-mounted device.

7. The method for recording a digital broadcast on the exchangeable storage medium according to claim 1, further comprising:
    automatically determining whether the storage medium contains sufficient unoccupied space for complete recording of the broadcast content when the recording condition is satisfied; and
    automatically erasing previously stored content on the storage medium if there is insufficient space.

8. An apparatus for recording the contents of a digital broadcast on an exchangeable storage medium, the apparatus comprising:
    a digital broadcast receiver for receiving the digital broadcast with n channels of data multiplexed therein such that a broadcast associated with each of the n channels is transmitted simultaneously within the digital broadcast, each of the n channels of data including audio data;
    a checking section for checking whether or not a first digital audio broadcast associated with one of the n channels satisfies a recording condition describing a user preference that is written in said exchangeables storage medium, by referring to information transmitted with the first digital audio broadcast; and
    a recording section for automatically recording, when the first digital audio broadcast satisfies the recording condition written on said exchangeable storage medium such that the broadcast contents of the first digital audio broadcast may be later retrieved from the exchangeables storage medium and audibly reproduced.

9. The recording apparatus according to claim 8, wherein said recording section writes summary information of the broadcast contents recorded on the exchangeable storage medium in a profile area of said exchangeable storage medium.

10. The recording apparatus according to claim 9, further comprising an operating section for indicating that said broadcast content data recorded on the exchangeable storage medium is in a rewritable state,
    wherein said recording section records a flag for designating the rewritable state, in response to a user designating the broadcast content data for deletion, into said profile area.

11. The recording apparatus according to claim 10, further comprising a profile reading section for reading profile information written in said profile area,
wherein, when there is no unoccupied space for recording new broadcast content data, said recording section regards a recording area where the rewritable broadcast content data indicated by said flag is recorded, as a new unoccupied space, and then records the new broadcast content data in the area.

12. The recording apparatus according to claim 8, wherein said recording condition is a musical artist's name or a title of a song.

13. The recording apparatus according to claim 8, wherein said recording condition describing the broadcast contents includes a password associated with a vehicle body or a vehicle-mounted device.

14. The recording apparatus according to claim 11, wherein said exchangeable storage medium is a portable memory stick.

15. The recording apparatus according to claim 11, wherein said exchangeable storage medium is a disc storage medium.

16. An exchangeable storage medium for storing the contents of a digital broadcast, comprising:
an area for recording profile information describing a digital audio broadcast containing music but not visual data, the profile information including one or more fields, at least one field is dedicated to indicating a recording condition based upon user's preferences; and
a broadcast content recording area for automatically recording the digital audio broadcast onto the exchangeable storage medium without user input when the digital audio broadcast may be subsequently audibly reproduced by electronically reading the broadcast content recording area, wherein the exchangeable storage medium is removably attachable to a music system.

17. The exchangeable storage medium according to claim 16, further comprising:
an area for storing summary information describing said recording digital audio broadcast on an unoccupied space in the broadcast content recording area; and
an area for writing a flag in response to the broadcast content recording area containing data which is in a rewritable state, the flag designating the rewritable state.

18. The exchangeable storage medium according to claim 16, wherein the profile information includes a first field dedicated to indicating a song's name.

19. The exchangeable storage medium according to claim 18, wherein the profile information includes a second field dedicated to indicating that the digital audio broadcast stored in the area may be written over.

20. The exchangeable storage medium according to claim 17, wherein the profile information includes a first field dedicated to indicating a song's name.

* * * * *